(12) United States Patent
Ali et al.

(10) Patent No.: US 12,477,431 B2
(45) Date of Patent: Nov. 18, 2025

(54) FAST MASTER CELL GROUP (MCG) FAILURE RECOVERY

(71) Applicant: Nokia Technologies Oy, Espoo (FI)

(72) Inventors: Amaanat Ali, Espoo (FI); Elena Virtej, Espoo (FI); Henri Markus Koskinen, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 456 days.

(21) Appl. No.: 17/997,283

(22) PCT Filed: Apr. 16, 2021

(86) PCT No.: PCT/EP2021/059922
§ 371 (c)(1),
(2) Date: Oct. 27, 2022

(87) PCT Pub. No.: WO2021/228491
PCT Pub. Date: Nov. 18, 2021

(65) Prior Publication Data
US 2023/0171666 A1    Jun. 1, 2023

(30) Foreign Application Priority Data

May 15, 2020 (EP) .................................... 20175052

(51) Int. Cl.
*H04W 36/30* (2009.01)
*H04W 36/00* (2009.01)

(52) U.S. Cl.
CPC ..... *H04W 36/305* (2018.08); *H04W 36/0055* (2013.01)

(58) Field of Classification Search
CPC ........... H04W 36/305; H04W 36/0055; H04W 76/15; H04W 76/16; H04W 76/12; H04W 76/19
See application file for complete search history.

(56) References Cited

U.S. PATENT DOCUMENTS

| | | |
|---|---|---|
| 2019/0182689 A1 | 6/2019 | Martin et al. |
| 2020/0045764 A1 | 2/2020 | Kim et al. |

(Continued)

FOREIGN PATENT DOCUMENTS

| | | |
|---|---|---|
| EP | 3142452 A1 | 3/2017 |
| WO | 2018/203710 A1 | 11/2018 |

(Continued)

OTHER PUBLICATIONS

"PDCP issue in Fast MCG Link Recovery", 3GPP TSG-RAN WG2 #107, R2-1909889, Agenda: 11.10.5, LG Electronics Inc., Aug. 26-30, 2019, 5 Pages (Year: 2019).*

(Continued)

*Primary Examiner* — Mohammad S Adhami
*Assistant Examiner* — Samuel Dilan Rutnam
(74) *Attorney, Agent, or Firm* — Lippes Mathias LLP

(57) ABSTRACT

Examples of the disclosure relate to an apparatus comprising means for: receiving configuration information to enable communication with a first node apparatus and with a second node apparatus, wherein the configuration information relates to split bearer communication; using the configuration information relating to the first node apparatus to communicate with the first node apparatus; storing the configuration information relating to the second node apparatus; and using the stored configuration information to switch from communicating with the first node apparatus to communicating with the second node apparatus if communicating with the first node apparatus has failed.

15 Claims, 5 Drawing Sheets

(56) References Cited

U.S. PATENT DOCUMENTS

| | | |
|---|---|---|
| 2020/0059395 A1 | 2/2020 | Chen |
| 2020/0305213 A1 | 9/2020 | Teyeb et al. |

FOREIGN PATENT DOCUMENTS

| | | | | |
|---|---|---|---|---|
| WO | 2019/031948 A1 | | 2/2019 | |
| WO | WO-2019032002 A1 | * | 2/2019 | ........ H04W 72/1242 |
| WO | 2019/066707 A1 | | 4/2019 | |
| WO | WO-2020030278 A1 | * | 2/2020 | ...... H04W 36/00837 |
| WO | WO-2021194404 A1 | * | 9/2021 | ........ H04W 36/0016 |
| WO | WO-2023275341 A1 | * | 1/2023 | ...... H04W 36/00695 |

OTHER PUBLICATIONS

"Discussion on MCG failure recovery", 3GPP TSG-RAN WG2 Meeting #106, R2-1908050, Agenda: 11.10.5, NTT Docomo, Inc, May 13-17, 2019, pp. 1-3.

"CG fast recovery via alternative UL", 3GPP TSG-RAN WG2#108, R2-1914680, Agenda: 6.10.5, Huawei, Nov. 18-22, 2019, 2 pages.

"Remaining issues on fast MCG link recovery", 3GPP TSG-RAN WG2#108, R2-1914681, Agenda: 6.10.5, Huawei, Nov. 18-22, 2019, 4 pages.

"MCG failure report procedure in MR-DC", 3GPP TSG-RAN WG2 Meeting #105, R2-1900805, Agenda: 11.10.5, ZTE Corporation, Feb. 25-Mar. 1, 2019, pp. 1-5.

Extended European Search Report received for corresponding European Patent Application No. 20175052.8, dated Sep. 15, 2020, 12 pages.

"PDCP issue in Fast MCG link Recovery", 3GPP TSG-RAN WG2 #107, R2-1909889, Agenda: 11.10.5, LG Electronics Inc, Aug. 26-30, 2019, 5 pages.

"Network configuration for fast MCG recovery", 3GPP TSG-RAN WG2 #108, R2-1915244, Agenda: 6.10.5, NEC, Nov. 18-22, 2019, 3 pages.

"UL path switch in case of SCG failure in (NG)EN-DC", 3GPP TSG-RAN WG2#107, R2-1910272, Ericsson, Aug. 26-30, 2019, 2 pages.

"Configuration of MCG failure recovery", 3GPP TSG-RAN WG2 Meeting #108, R2-1915063, Agenda: 6.10.5, Nokia, Nov. 18-22, 2019, 2 pages.

International Search Report and Written Opinion received for corresponding Patent Cooperation Treaty Application No. PCT/EP2021/059922, dated Jun. 16, 2021, 15 pages.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NR; Packet Data Convergence Protocol (PDCP) specification (Release 16)", 3GPP TS 38.323, V16.6.0, Dec. 2021, pp. 1-40.

"3rd Generation Partnership Project; Technical Specification Group Radio Access Network; NR; Radio Link Control (RLC) protocol specification (Release 16)", 3GPP TS 38.322, V16.2.0, Dec. 2020, pp. 1-33.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.8.0, Dec. 2021, pp. 1-89.

Office action received for corresponding European Patent Application No. 20175052.8, dated Jul. 5, 2023, 4 pages.

Notice of Allowance received for corresponding European Patent Application No. 20175052.8, dated Aug. 2, 2024, 8 pages.

Office action received for corresponding Indian Patent Application No. 202247071146, dated Feb. 2, 2023, 6 pages.

Office action received for corresponding Chinese Patent Application No. 202180035617.5, dated Jun. 29, 2025, 8 pages of office action and 4 pages of translation available.

"Further issues for MCG fast recovery via Scg", 3GPP TSG RAN WG2 Meeting #107, R2-1910755, ZTE Corporation, Agenda Item: 11.10.5, Aug. 26-30, 2019, pp. 1-3.

"SRB primary path handling for MR-DC", 3GPP TSG-RAN WG2#107, R2-1910269, Ericsson, Agenda Item: 11.10.5, Aug. 26-30, 2019, pp. 1-5.

* cited by examiner

FAST MASTER CELL GROUP (MCG) FAILURE RECOVERY

RELATED APPLICATION

This application was originally filed as PCT Application No. PCT/EP2021/059922, filed on Apr. 16, 2021, which claims priority from EP Application No. 20175052.8, filed on May 15, 2020, each of which is incorporated herein by reference in its entirety.

TECHNOLOGICAL FIELD

Examples of the present disclosure relate to fast MCG failure recovery. Some relate to fast MCG failure recovery using a split bearer.

BACKGROUND

Fast MCG failure Recovery is a procedure that is followed by an Multi RAT-Dual Connection-capable (MR-DC) User Equipment (UE). The MR-DC capable UE could be configured for E-UTRA—New Radio Dual Connectivity (EN-DC), NR-NR Dual Connectivity (NR-DC) or any other suitable dual connectivity. In the event of Radio Link Failure (RLF) on Primary cell (PCell), the UE will not trigger the Radio Resource Control (RRC) re-establishment once the failure is observed from the Downlink (DL) link quality monitoring. Instead the UE initiates the MCG recovery mechanism. This means that, when MCG failure occurs, UE follows Secondary Cell Group (SCG) failure-like procedure and the UE will trigger an MCG Failure information to be sent to the Master Node (MN), via a secondary node (SN) which could be either though split Signalling Radio Bearer 1(SRB) or SRB3.

Once the indication is sent to SN, UE starts a timer T316, during which UE will be waiting for more instructions from MN. This means that once the SN forwards to MN the MCGFailureInformation message, MN in return will send a response message such as RRCReconfiguration (with reconfigurationWithSync) or RRCRelease.

In case UE gets the RRCRelease, UE will transition to IDLE. But in case UE gets the RRCReconfiguration it could handover (HO) to either the current MN or another target MN. In any case, upon reception of reconfiguration with sync the UE resumes MCG transmission if suspended.

Examples of the disclosure look to provide an improved process for fast MCG failure recovery.

BRIEF SUMMARY

According to various, but not necessarily all, examples of the disclosure there is provided an apparatus comprising means for: receiving configuration information to enable communication with a first node apparatus and with a second node apparatus, wherein the configuration information relates to split bearer communication; using the configuration information relating to the first node apparatus to communicate with the first node apparatus; storing the configuration information relating to the second node apparatus; and using the stored configuration information to switch from communicating with the first node apparatus to communicating with the second node apparatus if communicating with the first node apparatus has failed.

In some examples the apparatus may comprise means for; providing a failure indication relating to failure of communication with the first node apparatus; and in response to providing the failure indication, receiving an indication to communicate with the second node apparatus using the stored configuration information relating to the second node apparatus.

The configuration information to enable communication with a first node apparatus and a second node apparatus may be received during configuration of the split bearer.

The configuration information relating to communication with the second node apparatus may be received before communicating with the first node apparatus has failed.

The first node apparatus may comprise a master node (MN) and the second node apparatus comprises a secondary node (SN).

The first node apparatus may comprise a secondary node (SN) and the second node apparatus may comprise a master node (MN).

The failure indication may indicate that communication between the apparatus and the first node apparatus has already failed.

The failure indication may indicate that communication between the apparatus and the first node apparatus will fail soon.

The failure indication may be provided to the first node apparatus.

The failure indication may be provided to the second node apparatus.

According to various, but not necessarily all, examples of the disclosure there may be provided a first node apparatus comprising means for; enabling establishing of a split bearer with a second node apparatus; providing an indication to the second node apparatus identifying a cell group to which the split bearer is mapped; and providing an indication to the second node apparatus that traffic of the split bearer on the cell group is restricted.

The first node apparatus may comprise means for receiving a failure indication from an apparatus indicating that communication between an apparatus and the first node apparatus will fail soon.

The first node apparatus may comprise means for providing an indication to the second node apparatus that a leg of the split bearer hosted by the second node apparatus is to be used.

According to various, but not necessarily all, examples of the disclosure there may be provided a second node apparatus comprising means for; enabling establishing of a split bearer with a first node apparatus; receiving an indication from the first node apparatus identifying a cell group to which the split bearer is mapped; and receiving an indication from the first node apparatus that traffic of the split bearer on the cell group is restricted.

The second node apparatus may be configured to provide the configuration of the split bearer but does not allocate internal resources for the request.

The second node apparatus may comprise means for receiving a failure indication relating to failure of communication between an apparatus and the first node apparatus.

The second node apparatus may comprise means for receiving a failure indication from an apparatus indicating that communication between an apparatus and the first node apparatus has failed.

The second node apparatus may comprise means for using the configuration of the split bearer provided by the second node apparatus to communicate with the apparatus in response to receiving a failure indication.

BRIEF DESCRIPTION

Some examples will now be described with reference to the accompanying drawings in which.

ABBREVIATIONS

AMBR Aggregate Maximum Bit Rate
DCCA Dual Connectivity Carrier Aggregation
DL Down Link
DRB Data Radio Bearer
EN-DC E-UTRA—New Radio Dual Connectivity
E-UTRA Evolved UMTS Radio Access
GBR Guaranteed Bit Rate
HO Handover
MAC CE Medium Access Control Control Element
MCG Master Cell Group
MN Master Node
MR-DC Multi RAT Dual Connection
NR New Radio
NR-DC NR-NR Dual Connectivity
PDCP Packet Data Convergence Protocol
PDU Packet Data Unit
RLC Radio Link Control
RLF Radio Link Failure
RRC Radio Resource Control
SCG Secondary Cell Group
SN Secondary Node
SRB Signaling Radio Bearer
UE User Equipment
UMTS Universal Mobile Telecommunications System
UP User Plane
Uu UE-Utran interface
WI Work Item

DETAILED DESCRIPTION

Figure 1:
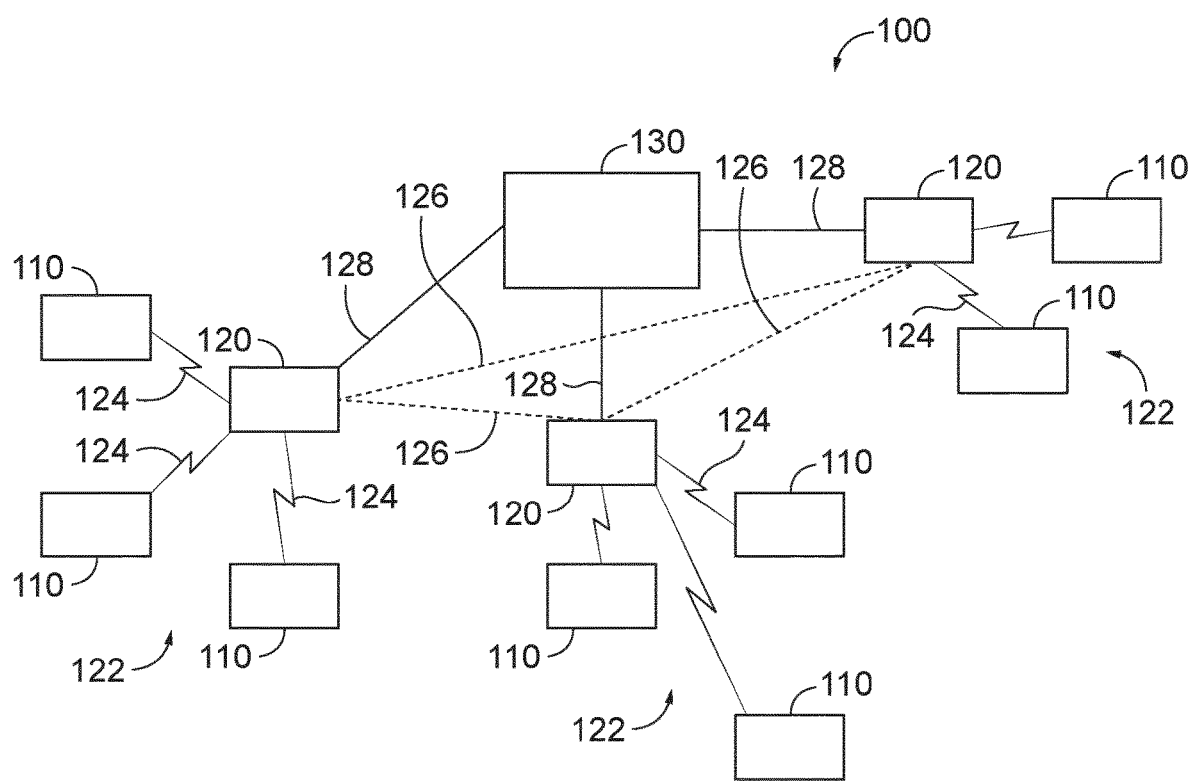
FIG. 1 shows an example of the subject matter described herein.

FIG. 1 illustrates an example of a network 100 comprising a plurality of network nodes including terminal nodes 110, access nodes 120 and one or more core nodes 130. The terminal nodes 110 and access nodes 120 communicate with each other. The one or more core nodes 130 communicate with the access nodes 120.

The one or more core nodes 130 can, in some examples, communicate with each other. The one or more access nodes 120 can, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 comprises a cellular radio transceiver. The terminal nodes 110 comprises a cellular radio transceiver.

In the example illustrated the cellular network 100 is a third generation Partnership Project (3GPP) network in which the terminal nodes 110 are user equipment (UE) and the access nodes 120 are base stations.

In the particular example illustrated the network 100 is a Universal Terrestrial Radio Access network (UTRAN). The UTRAN consists of UTRAN NodeBs 120, providing the UTRA user plane and control plane (RRC) protocol terminations towards the UE 110.

The NodeBs 120 are interconnected with each other and are also connected by means of the interface 128 to the Mobility Management Entity (MME) 130.

The term 'user equipment' is used to designate mobile equipment comprising a smart card for authentication/encryption etc such as a subscriber identity module (SIM). In other examples the term 'user equipment' is used to designate mobile equipment comprising circuitry embedded as part of the user equipment for authentication/encryption such as software SIM.

The NodeB can be any suitable base station. A base station is an access node 120. It can be a network element in radio access network responsible for radio transmission and reception in one or more cells to or from the user equipment.

The UTRAN can be a 4G or 5G network, for example. It can for example be a New Radio (NR) network that uses gNB or eNB as access nodes 120. New radio is the 3GPP name for 5G technology.

The access nodes 120 in the cellular network 100 shown in FIG. 1 could be configured to operate a split bearer in which a first access node 120 can be configured as a Master Node (MN) and a second access node 120 can be configured as a Secondary Node (SN). The split bearer could be for example a MN terminated split bearer.

During a MCG failure, if the MN has planned in advance to configure a MN terminated split bearer then data can flow through the split bearer via the SN leg so that by the time the MCG has been recovered the data flow could continue uninterrupted.

However, when the MN requests from the SN the MN terminated split bearer, the SN can reject the establishment of the split bearer on the basis that the MN is in control of scheduling and so could permanently use the SN leg. Also, the SN does not know how to differentiate between the use of the SN leg for the time frame during which MN is attempting a recovery and other uses.

Examples of the disclosure provide improved MCG failure recovery by addressing these issues.

Figure 2A:
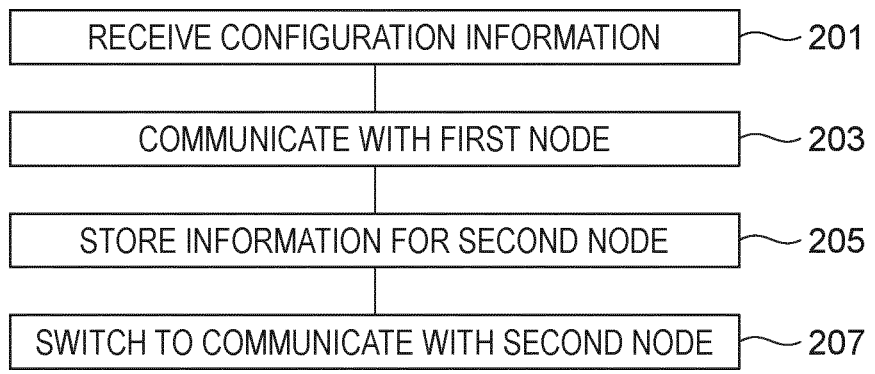
FIGS. 2A to 2C show another example of the subject matter described herein.

FIG. 2A shows a method for addressing these issues that can be implemented by an apparatus such as a UE 110.

The method comprises, at block 201, receiving configuration information to enable communication with a first node apparatus 120 and communication with a second node apparatus 120. The configuration information can be related to split bearer communication. The first node apparatus 120 and the second node apparatus 120 can be access nodes as shown in FIG. 1. The configuration information may be received as a single communication from a first node apparatus 120 and/or second node apparatus 120 or received as multiple communications from the first and/or second node apparatus 120.

The first node apparatus 120 and the second node apparatus 120 can be configured as a split bearer. The first node apparatus 120 and the second node apparatus 120 can be configured as an MN terminated split bearer. In this example the first node apparatus 120 can be the MN and the second node apparatus 120 can be the SN. It is to be appreciated that in other examples this could be reversed so that the first node apparatus 120 can be the SN and the second node apparatus 120 can be the MN.

The configuration information can be received by the UE during configuration of the split bearer. That is, the configuration information relating to communication with both the first node apparatus 120 and the second node apparatus 120 can be received at the same time and before any Radio Link Failure (RLF) has been identified.

In examples of the disclosure, a split bearer can comprise a reserve or "backup" leg that is used upon special cases, such as detection of MCG or SCG failure or link quality degradation (for example T310 running).

In some examples, during establishment of a split bearer, the first node apparatus 120 can provide an indication to the second node apparatus 120 that usage of one specific leg (Radio Link Control (RLC)) of the split bearer is expected to be restricted. The usage would be restricted in that it would be used in the event of the other leg becoming unusable due to a radio failure. For example, for an MN-terminated split bearer, that specific leg would typically be the SCG RLC, and vice versa, for an SN-terminated split bearer, that leg would typically be the MCG RLC.

In some examples, the node apparatus 120 (SN or MN) hosting the reserve or back up leg would need to provide the split bearer leg "configuration" and, in some examples, would not need to commit resources internally for the request.

At block 203 the method comprises using the configuration information relating to the first node apparatus 120 to communicate with the first node apparatus 120 and at block 205 the method comprises storing the configuration information relating to the second node apparatus 120. The configuration information relating to the second node apparatus 120 is stored but is not currently used for communication with the second node apparatus 120. The configuration information relating to the second node apparatus 120 can be stored in a memory of the UE 110. This means that the UE 110 is configured to send data to the MN, however the UE has the capability to send data to the SN should it need to. The configuration information enables the UE to maintain synchronization with both the MN and the SN. This enables the SN to provide a reserve or back-up leg of the split bearer.

At block 207 the method comprises using the stored configuration information to switch from communicating with the first node apparatus 120 to communicating with the second node apparatus 120 if communicating with the first node apparatus has failed.

In the event of RLF with the MN the UE 110 recognizes that it needs to switch to the reserve leg and use the SN. As the UE 110 already has the configuration information for the SN the UE 110 can retrieve the configuration information from storage and switch to the SN immediately and reduce any interruptions caused by the RLF with the MN.

In some examples the UE 110 can be configured to provide a failure indication relating to failure of communication with the first node apparatus 120. In some examples the failure indication can indicate that the RLF with the first node apparatus 120 has already occurred. In such examples the failure indication can be provided to the second node apparatus 120. In some examples the failure indication can indicate that the RLF with the first node apparatus 120 will happen soon. In such examples the failure indication can be provided to the first node apparatus 120 or the second node apparatus 120. In some examples the failure indication could be the appearance of traffic on the channel between the UE 110 and the second node apparatus 120. This can indicate that the RLF with the first node apparatus 120 has already failed.

In such examples, the failure indication can act as a trigger that causes the reserve leg of the split bearer to be activated. In response to providing the failure indication, the UE 110 can receive an indication to communicate with the second node apparatus 120 using the stored configuration information relating to the second node apparatus 120.

This can therefore enable the UE 110 to switch to using the reserve leg hosted by the SN.

Figure 2B:
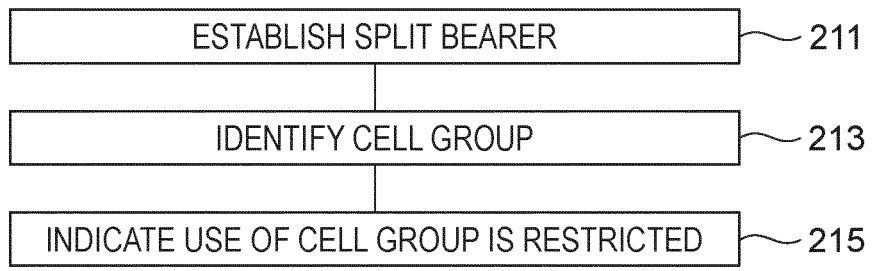

FIG. 2B shows a corresponding method that can be implemented by a first node apparatus 120.

The method comprises, at block 211, enabling establishing of a split bearer with a second node apparatus 120. In this example the first node apparatus 120 can be a MN and the second node apparatus 120 can be an SN. In other examples the first node apparatus 120 can be a SN and the second node apparatus 120 can be an MN.

At block 213 the method comprises providing an indication to the second node apparatus 120 identifying a cell group to which the split bearer is mapped. At block 215 the method comprises providing an indication that traffic of the split bearer on the cell group is restricted. The cell group can be hosted by an SN or and MN.

The traffic of the split bearer on the cell group can be restricted so that use of the cell group will be rare. The indication can provide an indication that the cell group will be used in the event of special cases such as MCG failure, SCG failure, Link quality degradation, congestion on another cell group or other suitable events.

The indications can be provided in any suitable format. For example, they can be provided as an additional bit in an XnAP SN Addition Request or SN Modification Request. In cases of EN-DC the indication can be provided as an additional bit in X2AP SgNB Addition Request or SgNB Modification Request for example.

This indication that traffic of the split bearer on the cell group is restricted can enable a split bearer to be established where the cell group is used as a reserve leg.

It is to be appreciated that the first node apparatus 120 can also send configuration information to a UE 110 which can be the UE 110 that performs the method as shown in FIG. 2A. This enables communication between the first node apparatus 120 and the UE 110.

The first node apparatus 120 can also be configured to receive a failure indication from an apparatus such as the UE 110 indicating that communication between the UE 110 and the first node apparatus 120 will fail soon. In response to receiving such a communication the first node apparatus 120 can then provide an indication to the second node apparatus 120 that a leg of the split bearer hosted by the second node apparatus 120 is to be used. The failure indication therefore acts as a trigger and enables the reserve leg of the split bearer to be used and the UE 110 to switch from communicating with the first node apparatus 120 to communicating with the second node apparatus 120.

Figure 2C:
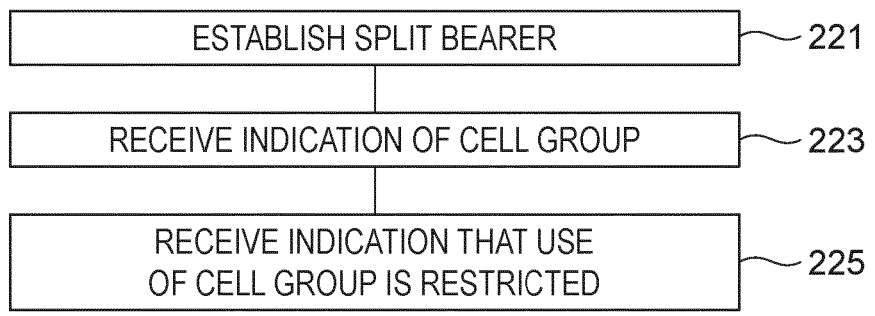

FIG. 2C shows a corresponding method that can be implemented by a second node apparatus 120.

The method comprises, at block 221, enabling establishing of a split bearer with a first node apparatus 120. In this example the first node apparatus 120 can be a MN and the second node apparatus 120 can be an SN. In other examples the first node apparatus 120 can be a SN and the second node apparatus 120 can be an MN.

At block 223 the method comprises receiving an indication from the first node apparatus 120 identifying a cell group to which the split bearer is mapped and at block 225 the method comprises receiving an indication from the first node apparatus 120 that traffic of the split bearer on the cell group is restricted.

The traffic of the split bearer on the cell group can be restricted so that use of the cell group will be rare. As described above, the indication can provide an indication that the cell group will be used in the event of special cases such as MCG failure, SCG failure, Link quality degradation, congestion on another cell group or other suitable events.

The indications can be received in any suitable format for example it can be received as an additional bit in an XnAP SN Addition Request or SN Modification Request. In cases of EN-DC the indication can be received as an additional bit in X2AP SgNB Addition Request or SgNB Modification Request for example.

The node hosting the indicated cell group can provide the configuration of the split bearer but does not need to allocate internal resources for the request. This allows the indicated cell group to act as a reserve or back-up leg. This allows resources of the cell group to be used for other purposes. These may make it easier for the second node apparatus 120 to accept the request to establish a split bearer.

The second node apparatus 120 can also be configured to receive a failure indication relating to failure of communication between a UE 110 and the first node apparatus 120. In some examples the failure indication can indicate that the communication between the UE 110 and the first node apparatus 120 has already failed. In such examples the failure indication can be received from the UE 110. In some examples the failure indication can indicate the communication between the UE 110 and the first node apparatus 120 will fail soon. This failure indication could be received from the UE 110 or from the first node apparatus 120.

The failure indication acts as a trigger to activate the reserve leg of the split bearer. In response to receiving the failure indication the second node apparatus 120 can be configured to establish communication with the UE. The configuration of the split bearer provided by the second node apparatus 120 can be used to communicate with the UE in response to the failure indication. This therefore enables reserve leg of the split bearer to be used and enables the UE 110 to switch from communicating with the first node apparatus 120 to communicating with the second node apparatus 120.

In some examples, the second node apparatus 120 that is hosting the reserve leg takes the reserve leg into use upon reception of a trigger. The trigger can be reception by the SN of MCG failure indication from the UE 110, by UP packet (for example, by using the previously deactivated backup leg), RRC/MAC CE signalling (for example, MCGFailureInformation or specific other RRC message or MAC CE indicating that MCG failure has happened or may happen soon).

In some examples, establishing communication with the UE can comprise the second node apparatus 120 informing the first node apparatus 120 that Packet Data Convergence Protocol (PDCP) Packet Data Units (PDUs) can now be scheduled on the reserve leg of the split bearer. The informing of the first node apparatus 120 can either be implicit or explicit. For example, the second node apparatus 120 can send an MCGFailureInformation-message to the first node apparatus 120 to implicitly inform the first node apparatus 120. In other examples the second node apparatus 120 can configure a field within the X2AP/XnAP RRCTransfer-message to contain the RRC MCGFailureInformation that has been received from the UE 110 so that this RRC MCGFailureInformation is provided to the first node apparatus 120.

In some examples the second node apparatus 120 can also establish communication with the UE by providing an indication to the UE that the reserve leg is active for DL. The decision about activating the reserve leg can be made by either the first node apparatus 120 or the second node apparatus 120 or a combination of both of the node apparatus 120. Once this indication has been received by the UE the UE considers the Data Radio Bearer (DRB) as using the reserve leg.

In some examples, the first node apparatus 120 that is hosting PDCP for the bearer can be informed by the UE 110 of an impending cell-group failure using a specific RRC message or MAC CE. The cell group can be the MCG or SCG. In such examples, the first node apparatus 120 can start sending DL PDCP PDUs towards the second node apparatus 120 hosting the reserve leg. The DL PDCP PDUs can comprise a user-plane indication to the second node apparatus 120 to start scheduling those PDUs on the reserve leg.

It is to be appreciated that different types of failure indication can be provided to the second node apparatus 120 and/or the first node apparatus 120. In some examples the failure indication that is provided to the second node apparatus 120 could comprise the UE starting to send UL PDCP PDUs towards the second node apparatus 120. The UL PDCP PDUs can comprise a user-plane indication to the second node apparatus 120 to start scheduling the PDUs on the reserve leg.

These example methods enable a second node apparatus 120 to admit a split bearer request and allow the leg hosted by the second node apparatus 120 to be used in special cases such as fast MCG failure recovery. This allows the usual admission control to be bypassed.

Figure 3:
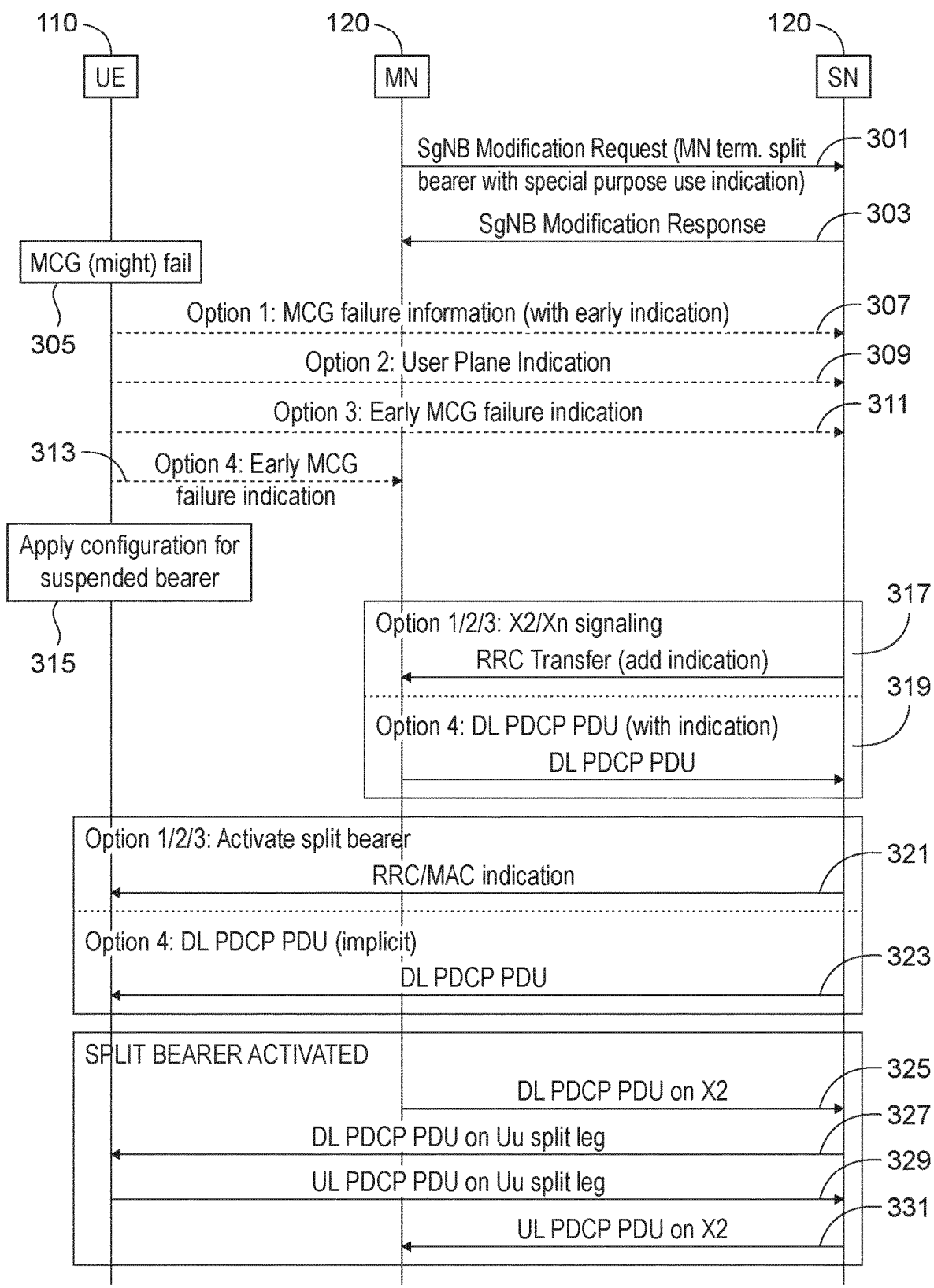
FIG. 3 shows another example of the subject matter described herein.

FIG. 3 illustrates another example method that can be implemented by a system comprising a UE 110 a first node apparatus 120 acting as MN and a second node apparatus 120 acting as SN.

In some examples, during the setup of the split bearer, the MN indicates to the SN that it would like to reserve the split leg resources for the bearer (s) but only use it during the fast MCG failure recovery. The SN can use this hint to not reject the split leg of the bearer but just to provide the corresponding configuration. In this example the split bearer is an MN terminated split bearer.

At block 301 the MN transmits the Secondary gNB Modification Request (for example, SgNB Modification Request) to the SN. The SgNB Modification Request comprises information that enables the split bearer to be established with the MN and the SN. The SgNB Modification Request can also comprise an indication that use of the leg hosted by the SN will be restricted. This indication can be provided as an additional bit in the SgNB Modification Request. This indication ensures that the SN only needs to provide the configuration for the split bearer and does not need to commit resources to this request.

The SN responds to the SgNB Modification Request by transmitting the SgNB Modification Response at block 303. This enables the split bearer to be established.

At block 305 the UE 110 communicates with the MN using the MCG. The UE uses configuration information received from the MN to communicate with the MN using the MCG. The UE has stored configuration information from the SN that enables the leg hosted by the SN to be used as a reserve leg.

However, the MCG could fail. The UE 110 is configured to provide a failure indication in the event of MCG failure. There are several examples of different types of failure indication that could be provided in different examples of the disclosure.

Block 307 shows a first option for a failure indication that can be provided. In this first option the failure indication comprises an MCG failure indication message that can be provided from the UE to the SN. The MCG failure indication can indicate that the MCG has already failed or that it will fail soon.

Block 309 shows a second option for a failure indication that can be provided. In this second option the failure indication comprises a user plane indication from the UE 110 that is provided from the UE 110 to the SN. The failure indication could comprise the UE 110 starting to send DL PDCP PDUs towards the SN. The DL PDCP PDUs can comprise a user-plane indication to the SN to start scheduling the PDUs on the reserve leg.

Block 311 shows a third option for a failure indication that can be provided. In this third option the failure indication comprises an Early MCG Failure Indication Message that is provided from the UE 110 to the SN.

Block 313 shows a fourth option for a failure indication that can be provided. In this fourth option the failure indication comprises an Early MCG Failure Indication Message that is provided from the UE 110 to the MN.

At block 315 the UE 110 retrieves the configuration information relating to the SN and applies this configuration.

The failure indication acts as a trigger that causes the SN to inform the MN that the reserve leg of the split bearer hosted by the SN can now be used. Block 317, shows an RRC transfer message being provided to the MN from the SN. This method can be used if any of options 1 to 3 have been used for the failure indication. This option provides the MN with an explicit indication that the reserve leg of the split bearer is to be used. In this example the SN can configure a field within the X2AP/XnAP RRCTransfermessage to contain the RRC MCGFailureInformation that has been received from the UE 110

As an alternative block 319 shows the MN sending a DL PDCP PDU to the SN. This option can be used if option 4 is used for the failure indication and the MN has been informed of the failure of the MCG. The DL PDCP PDU can be provided with an indication that the reserve leg of the split bearer is now to be used.

At block 321 the SN activates the reserve leg of the split bearer by sending the RRC/MAC indication to the UE. This could be used if options 1 to 3 have been used for the failure indication. At block 323 the SN can activate the reserve leg of the split bearer by scheduling the DL PDCP PDU on the reserve leg of the split bearer. The UE can apply the configuration of the reserve leg of the split bearer before providing the failure indication.

Once the reserve leg of the split bearer has been activated then the UE can use the bearer leg hosted by the SN. At block 325 a DL PDCP PDU is transmitted from the MN to SN. In response to this, at block 327 the DL PDCP PDU is transmitted from the SN to the UE on the reserve split bearer leg and at 329 the UL PDCP PDU is transmitted from the UE to the SN on the reserve split bearer leg. The UL PDCP PDU can then be transmitted from the SN to MN as shown at block 331.

Figure 4:
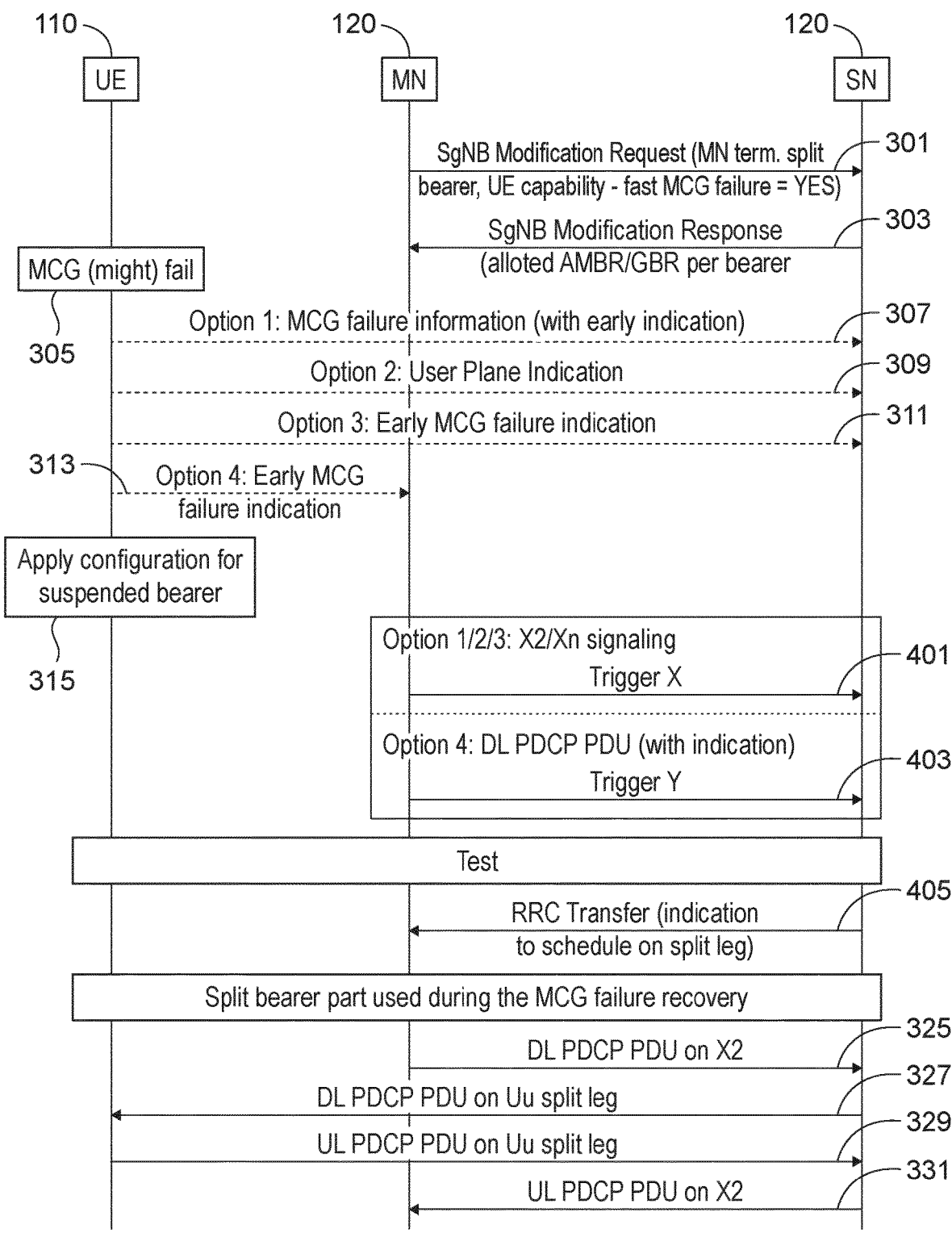
FIG. 4 shows another example of the subject matter described herein.

FIG. 4 illustrates another example method that can be implemented by a system comprising a UE 110 a first node apparatus 120 acting as MN and a second node apparatus 120 acting as SN. In this method blocks 301 to 315 are as shown in FIG. 3 and corresponding reference numerals are used.

In this method a trigger to cause the SN to start to use the split bearer leg is provided from the MN. A first example trigger could be the use of X2/Xn signaling from the MN to the SN as shown at block 401. This option could be used if any of options 1 to 3 have been used by the UE to provide the failure indication. A second example trigger could be the use of DL PDCP PDU being transmitted from the MN to the SN as shown at block 403. The DL PDCP PDU can comprise an indication that the reserve leg of the split bearer is to be used.

In response to receiving a trigger the SN is configured to transmit an RRC transfer message to the MN as shown at block 405. The RRC transfer message can include an indication that the reserve leg of the split bearer can now be used for scheduling.

This enables the reserve leg of the split bearer to be used so that at blocks 325 to 331 PDCP PDU are transmitted using the reserve leg as described above.

It is to be appreciated that variations of the above methods can be used in examples of the disclosure. For example, instead of the first node apparatus 120 indicating to the second node apparatus 120 that the reserve leg of the split bearer is to be used, the second node apparatus 120 can indicate to the first node apparatus 120 that it can offer up to a given Aggregate Maximum Bit Rate (AMBR)/Guaranteed Bit Rate (GBR) for the split bearer. This indication could be combined with information that the fast recovery is supported for the UE 110.

It is to be appreciated that more than one failure indication can be provided by the UE 110 and so some blocks of the methods can be occurring in parallel.

Examples of the disclosure therefore enable the second node apparatus 120 to admit a split bearer request from a first node apparatus 120 and allow the leg hosted by the second node apparatus 120 to be used in the event of MCG failure. The examples of the disclosure enable the usual admission control to be bypassed and reduce interruption time in the event of MCG failure. The interruption time is reduced because the UE 110 does not have to wait to process a RRC reconfiguration with a bearer type change from MN terminated bearer to MN terminated split bearer/SN terminated bearer during the fast MCG failure recovery procedure. Examples of the disclosure also address issues with resource allocation within the second node apparatus 120 as the second node apparatus 120 does not need to commit resources immediately.

Figure 5A:
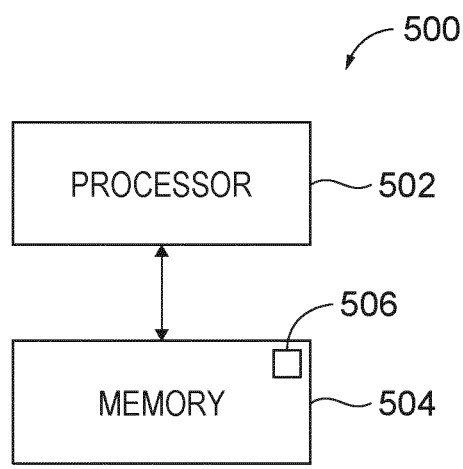
FIGS. 5A and 5B show another example of the subject matter described herein.

FIG. 5A illustrates an example of a controller 500. The controller 500 could be provided within an apparatus such as a first node apparatus 120, a second node apparatus 120 or a UE 110. Implementation of a controller 500 may be as controller circuitry. The controller 500 may be implemented in hardware alone, have certain aspects in software including firmware alone or can be a combination of hardware and software (including firmware).

As illustrated in FIG. 5A the controller 500 may be implemented using instructions that enable hardware functionality, for example, by using executable instructions of a computer program 506 in a general-purpose or special-purpose processor 502 that may be stored on a computer readable storage medium (disk, memory etc) to be executed by such a processor 502.

The processor 502 is configured to read from and write to the memory 504. The processor 502 may also comprise an output interface via which data and/or commands are output by the processor 502 and an input interface via which data and/or commands are input to the processor 502.

The memory 504 stores a computer program 506 comprising computer program instructions (computer program code) that controls the operation of the apparatus 110, 120 when loaded into the processor 502. The computer program instructions, of the computer program 506, provide the logic and routines that enables the apparatus to perform the methods illustrated in FIGS. 2A to 4 The processor 502 by reading the memory 504 is able to load and execute the computer program 506.

In examples where the apparatus is provided within a UE 110 the apparatus therefore comprises:
- at least one processor 502; and
- at least one memory 504 including computer program code
- the at least one memory 504 and the computer program code configured to, with the
- at least one processor 502, cause the apparatus at least to perform:
  - receiving 201 configuration information to enable communication with a first node apparatus and with a second node apparatus, wherein the configuration information relates to split bearer communication;
  - using 203 the configuration information relating to the first node apparatus to communicate with the first node apparatus;
  - storing 205 the configuration information relating to the second node apparatus; and
  - using 207 the stored configuration information to switch from communicating with the first node apparatus to communicating with the second node apparatus if communicating with the first node apparatus has failed.

In examples where the apparatus is provided within a first node apparatus 120 the apparatus therefore comprises:
- at least one processor 502; and
- at least one memory 504 including computer program code
- the at least one memory 504 and the computer program code configured to, with the
- at least one processor 502, cause the first node apparatus 120 at least to perform:
  - enabling 211 establishing of a split bearer with a second node apparatus 120;
  - providing 213 an indication to the second node apparatus 120 identifying a cell group to which the split bearer is mapped; and
  - providing 215 an indication to the second node apparatus 120 that traffic of the split bearer on the cell group is restricted.

In examples where the apparatus is provided within a second node apparatus 120 the apparatus therefore comprises:
- at least one processor 502; and
- at least one memory 504 including computer program code
- the at least one memory 504 and the computer program code configured to, with the
- at least one processor 502, cause the second node apparatus 120 at least to perform:
  - enabling 221 establishing of a split bearer with a first node apparatus 120;
  - receiving 223 an indication from the first node apparatus 120 identifying a cell group to which the split bearer is mapped; and
  - receiving 225 an indication from the first node apparatus120 that traffic of the split bearer on the cell group is restricted.

Figure 5B:
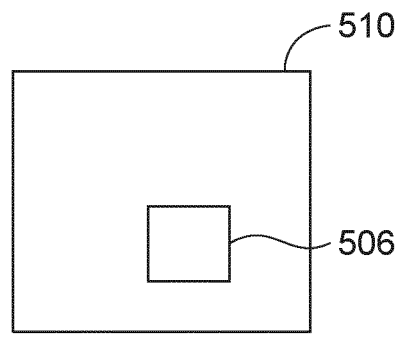

As illustrated in FIG. 5B, the computer program 506 may arrive at the apparatus 110, 120 via any suitable delivery mechanism 510. The delivery mechanism 510 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 506. The delivery mechanism may be a signal configured to reliably transfer the computer program 506. The apparatus 110, 120 may propagate or transmit the computer program 506 as a computer data signal.

Computer program instructions for causing a UE 110 to perform at least the following or for performing at least the following:
- receiving 201 configuration information to enable communication with a first node apparatus 120 and with a second node apparatus 120 wherein the configuration information relates to split bearer communication;
- using 203 the configuration information relating to the first node apparatus 120 to communicate with the first node apparatus 120;
- storing 205 the configuration information relating to the second node apparatus 120; and
- using 207 the stored configuration information to switch from communicating with the first node apparatus 120 to communicating with the second node apparatus 120 if communicating with the first node apparatus 120 has failed.

Computer program instructions for causing a first node apparatus 120 to perform at least the following or for performing at least the following:
- enabling 211 establishing of a split bearer with a second node apparatus 120;
- providing 213 an indication to the second node apparatus 120 identifying a cell group to which the split bearer is mapped; and
- providing 215 an indication to the second node apparatus 120 that traffic of the split bearer on the cell group is restricted.

Computer program instructions for causing a second node apparatus 120 to perform at least the following or for performing at least the following:
- enabling 221 establishing of a split bearer with a first node apparatus 120;
- receiving 223 an indication from the first node apparatus 120 identifying a cell group to which the split bearer is mapped; and
- receiving 225 an indication from the first node apparatus 120 that traffic of the split bearer on the cell group is restricted.

The computer program instructions may be comprised in a computer program, a non-transitory computer readable medium, a computer program product, a machine readable medium. In some but not necessarily all examples, the computer program instructions may be distributed over more than one computer program.

Although the memory 504 is illustrated as a single component/circuitry it may be implemented as one or more separate components/circuitry some or all of which may be integrated/removable and/or may provide permanent/semi-permanent/dynamic/cached storage.

Although the processor 502 is illustrated as a single component/circuitry it may be implemented as one or more separate components/circuitry some or all of which may be integrated/removable. The processor 502 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in FIGS. 2 to 4 can represent steps in a method and/or sections of code in the computer program 506. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

From the foregoing it will be appreciated that in some examples there is provided a system comprising: at least one UE 100 a first node apparatus 120 and a second node apparatus 120.

In some but not necessarily all examples, the UE 110, the first node apparatus 120 and the second node apparatus 120 are configured to communicate data with or without local storage of the data in a memory 504 at the UE 110, the first node apparatus 120 or the second node apparatus 120 and with or without local processing of the data by circuitry or processors at the UE 110, the first node apparatus 120 or the second node apparatus 120.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The UE 110, the first node apparatus 120 and the second node apparatus 120 can be part of the Internet of Things forming part of a larger, distributed network.

The processing of the data, whether local or remote, can be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the UE 110, first node apparatus 120 or second node apparatus 120 where it may produce an output sensible to the subject such as an audio output, visual output or haptic output.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   at least one processor; and
   at least one memory comprising computer program code,
   the at least one memory and computer program code are configured, with the at least one processor, to cause the apparatus at least to:
   receive configuration information to enable communication with a first node apparatus and with a second node apparatus, wherein the configuration information relates to split bearer communication;
   use the configuration information relating to the first node apparatus to communicate with the first node apparatus;
   store the configuration information relating to the second node apparatus; and
   use the stored configuration information to switch from communicating with the first node apparatus to communicating with the second node apparatus if communicating with the first node apparatus has failed,
   wherein a split bearer comprises a reserve leg that is used in special cases, the special cases at least comprising detection of master cell group or secondary cell group failure and link quality degradation,
   wherein the configuration information relating to the second node apparatus is stored in a memory of the apparatus,
   wherein the first node apparatus and the second node apparatus are configured as a master node terminated split bearer with either the first node apparatus or the second node apparatus comprising the master node and the other node apparatus comprising the secondary node,
   wherein the apparatus is configured to send data to the master node and send data to the secondary node only when needed,
   wherein the configuration information enables the apparatus to maintain synchronization with both the master node and the secondary node and enables the secondary node to provide a reserve or back-up leg of the split bearer,
   wherein when there is a radio link failure with the master node, the apparatus recognizes a need to switch to the reserve leg and uses the secondary node,
   wherein the apparatus retrieves configuration information for the secondary node from storage and switches to the secondary node immediately,
   wherein the failure indication at least includes an appearance of traffic on a channel between the apparatus and the second node apparatus to indicate that the radio link with the first node apparatus has already failed.

2. An apparatus as claimed in claim 1, wherein the at least one memory and computer program code are configured, with the at least one processor, to cause the apparatus at least to:
   provide a failure indication relating to failure of communication with the first node apparatus; and
   in response to providing the failure indication, receive an indication to communicate with the second node apparatus using the stored configuration information relating to the second node apparatus.

3. An apparatus as claimed in claim 1 wherein the configuration information to enable communication with a first node apparatus and a second node apparatus are received during configuration of the split bearer.

4. An apparatus as claimed in claim 1 wherein the configuration information relating to communication with the second node apparatus is received before communicating with the first node apparatus has failed.

5. An apparatus as claimed in claim 1 wherein the first node apparatus comprises a master node (MN) and the second node apparatus comprises a secondary node (SN).

6. An apparatus as claimed in claim 1 wherein the first node apparatus comprises a secondary node (SN) and the second node apparatus comprises a master node (MN).

7. An apparatus as claimed in claim 2 wherein the failure indication indicates that communication between the apparatus and the first node apparatus has already failed.

8. A method comprising:
   receiving configuration information to enable communication with a first node apparatus and with a second node apparatus, wherein the configuration information relates to split bearer communication;

using the configuration information relating to the first node apparatus to communicate with the first node apparatus;
storing the configuration information relating to the second node apparatus; and
using the stored configuration information to switch from communicating with the first node apparatus to communicating with the second node apparatus if communicating with the first node apparatus has failed,
wherein a split bearer comprises a reserve leg that is used in special cases, the special cases at least comprising detection of master cell group or secondary cell group failure and link quality degradation,
wherein the configuration information relating to the second node apparatus is stored in a memory of the apparatus,
wherein the first node apparatus and the second node apparatus are configured as a master node terminated split bearer with either the first node apparatus or the second node apparatus comprising the master node and the other node apparatus comprising the secondary node,
the method further comprising:
sending data to the master node and sending data to the secondary node only when needed,
using the configuration information to maintain synchronization with both the master node and the secondary node and enable the secondary node to provide a reserve or back-up leg of the split bearer,
when there is a radio link failure with the master node, recognizing a need to switch to the reserve leg and using the secondary node,
retrieving configuration information for the secondary node from storage and switching to the secondary node immediately,
wherein the failure indication at least includes an appearance of traffic on a channel between the apparatus and the second node apparatus to indicate that the radio link with the first node apparatus has already failed.

9. A computer program product comprising at least one computer-readable storage memory having computer-executable code portions stored therein, the computer-executable code portions comprising computer program instructions for causing a user equipment (UE) to perform at least the following or for performing at least the following:
receiving configuration information to enable communication with a first node apparatus and with a second node apparatus, wherein the configuration information relates to split bearer communication;
using the configuration information relating to the first node apparatus to communicate with the first node apparatus;
storing the configuration information relating to the second node apparatus; and
using the stored configuration information to switch from communicating with the first node apparatus to communicating with the second node apparatus if communicating with the first node apparatus has failed,
wherein a split bearer comprises a reserve leg that is used in special cases, the special cases at least comprising detection of master cell group or secondary cell group failure and link quality degradation,
wherein the configuration information relating to the second node apparatus is stored in a memory of the apparatus,
wherein the first node apparatus and the second node apparatus are configured as a master node terminated split bearer with either the first node apparatus or the second node apparatus comprising the master node and the other node apparatus comprising the secondary node,
the computer program instructions for causing the user equipment to perform at least the following:
sending data to the master node and sending data to the secondary node only when needed,
using the configuration information to maintain synchronization with both the master node and the secondary node and enable the secondary node to provide a reserve or back-up leg of the split bearer,
when there is a radio link failure with the master node, recognizing a need to switch to the reserve leg and using the secondary node,
retrieving configuration information for the secondary node from storage and switching to the secondary node immediately,
wherein the failure indication at least includes an appearance of traffic on a channel between the apparatus and the second node apparatus to indicate that the radio link with the first node apparatus has already failed.

10. A first node apparatus, comprising:
at least one processor; and
at least one memory comprising computer program code,
the at least one memory and computer program code are configured, with the at least one processor, to cause the first node apparatus at least to:
enable establishing of a split bearer with a second node apparatus;
provide an indication to the second node apparatus identifying a cell group to which the split bearer is mapped; and
provide an indication to the second node apparatus that traffic of the split bearer on the cell group is restricted,
wherein the traffic of the split bearer on a cell group is restricted to special cases, the special cases including main cell group failure, secondary cell group failure, link quality degradation, and congestion on another cell group,
wherein the indication that traffic of the split bearer on the cell group is restricted enables a split bearer to be established where the cell group is used as a reserve leg.

11. A first node apparatus as claimed in claim 10, wherein the at least one memory and computer program code are configured, with the at least one processor, to cause the first node apparatus at least to provide an indication to the second apparatus that a leg of the split bearer hosted by the second node apparatus is to be used,
wherein the indication is configured to be provided in as an additional bit in an XnAP SN Addition Request or SN Modification Request or in cases of EN-DC the indication is provided as an additional bit in X2AP SgNB Addition Request or SgNB Modification Request.

12. A second node apparatus comprising:
at least one processor; and
at least one memory comprising computer program code,
the at least one memory and the computer program code are configured, with the least one processor, to cause the second node apparatus at least to:
enable establishing of a split bearer with a first node apparatus;
receive an indication from the first node apparatus identifying a cell group to which the split bearer is mapped; and receive an indication from the first node apparatus that traffic of the split bearer on the cell group is restricted, wherein the traffic of the split bearer on a cell group is restricted to special cases, the special cases including main cell group failure, secondary cell group failure, link quality degradation, and congestion on another cell group, wherein the indication that traffic of the split bearer on the cell group is restricted enables a split bearer to be established where the cell group is used as a reserve leg.

13. A second node apparatus as claimed in claim 12 wherein the second node apparatus provides the configuration of the split bearer but does not allocate internal resources for the request, wherein the indication is configured to be provided in as an additional bit in an XnAP SN Addition Request or SN Modification Request or in cases of EN-DC the indication is provided as an additional bit in X2AP SgNB Addition Request or SgNB Modification Request.

14. A second node apparatus as claimed in claim 12, wherein the at least one memory and computer program code are configured, with the at least one processor, to cause the second node apparatus at least to provide a failure indication relating to failure of communication between an apparatus and the first node apparatus.

15. A second node apparatus as claimed in claim 12, wherein the at least one memory and computer program code are configured, with the at least one processor, to cause the second node apparatus at least to receive a failure indication from an apparatus indicating that communication between an apparatus and the first node apparatus has failed.

* * * * *